UNITED STATES PATENT OFFICE.

E. F. GERDOM AND C. W. SCHINDLER, OF ALBANY, NEW YORK.

IMPROVED LUBRICATING COMPOUND.

Specification forming part of Letters Patent No. 80,471, dated July 28, 1868.

*To all whom it may concern:*

Be it known that we, E. F. GERDOM and C. W. SCHINDLER, both of Albany, in the county of Albany, State of New York, have invented a new and Improved Lubricating Compound; and we do hereby declare the following to be a full, clear, and exact description thereof, which will enable those skilled in the art to make and use the same.

This invention relates to a compound of fat or oil, wax, rosin, india-rubber, and potash, in such proportion that a mixture is obtained which will melt at a certain temperature, say from 100° to 110° Fahrenheit, so that when the same is placed in an oil-cup which is in contact with a journal to be oiled, the lubricating compound will begin to melt as soon as the journal commences to run hot; but when the journal is cold the lubricating material sets, and the operation of lubricating a journal can be effected automatically and entirely without waste.

The proportion in which we mix the ingredients of our lubricating compound together is about as follows: Fat or oil, one hundred pounds; wax, three pounds; rosin, three pounds; india-rubber, three pounds; potash, three pounds.

The fat, wax, rosin, and india-rubber we mix together, and heat the mass until all the ingredients have melted, and then we add the potash, previously dissolved in water, and stir the whole mass until it is uniformly mixed. When this is accomplished we leave the mass to cool, and the compound is ready for immediate use.

The proportion of the ingredients may be slightly varied, according to the nature of the fat to be used. The fat which we use by preference is tallow; but any other animal or vegetable fat may be substituted therefor without materially changing the result. The compound thus prepared melts at a temperature of from 100° to 110°, and as soon as it begins to melt it runs off as a clear, oil-like liquid. When the temperature sinks below the above-named number of degrees our compound sets.

We use our compound with particular advantage in oil-cups of that class which are in direct contact with the journal to be oiled, so that as soon as the journal commences to run hot the compound melts and flows down on the journal; but when the journal remains cool and requires no lubrication our compound sets or remains set, and the process of lubrication is effected entirely automatically and without any waste.

Having thus described our invention, what we claim as new, and desire to secure by Letters Patent, is—

A lubricating compound made of the ingredients above specified, and mixed together in about the proportion and substantially in the manner set forth.

This specification signed by us this 18th day of June, 1868.

E. F. GERDOM.
C. W. SCHINDLER.

Witnesses:
W. HAUFF,
E. F. KASTENHUBER.